United States Patent
Heyer

(10) Patent No.: US 8,898,916 B2
(45) Date of Patent: *Dec. 2, 2014

(54) WINDOW FRAME DEFLECTION MEASUREMENT DEVICE AND METHOD OF USE

(75) Inventor: Daniel Heyer, Lilburn, GA (US)

(73) Assignee: EFI Global, Inc., Humble, TX (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/324,916

(22) Filed: Dec. 13, 2011

(65) Prior Publication Data

US 2012/0174422 A1    Jul. 12, 2012

Related U.S. Application Data

(63) Continuation-in-part of application No. 12/590,552, filed on Nov. 10, 2009, now Pat. No. 8,104,187.

(51) Int. Cl.
*G01C 9/00* (2006.01)
*G01B 5/20* (2006.01)
*G01C 25/00* (2006.01)

(52) U.S. Cl.
CPC . *G01C 9/00* (2013.01); *G01C 25/00* (2013.01)
USPC ............ 33/375; 33/374; 33/376; 33/533

(58) Field of Classification Search
USPC .......... 33/375, 374, 376, 832, 833, 501.05, 33/501.08, 501.09, 533, 548, 549, 33/551–555, 557, 560, 572, 502
See application file for complete search history.

(56) References Cited

U.S. PATENT DOCUMENTS

| | | | |
|---|---|---|---|
| 4,289,382 A * | 9/1981 | Clark | 345/50 |
| 4,691,443 A | 9/1987 | Hamilton et al. | |
| 4,862,595 A | 9/1989 | Drumright | |
| 4,894,920 A * | 1/1990 | Butler et al. | 33/203.11 |
| 4,939,848 A | 7/1990 | Armstrong | |
| 5,189,798 A | 3/1993 | La Force | |
| 5,303,480 A | 4/1994 | Chek | |
| 5,343,628 A | 9/1994 | Ham | |
| 5,388,338 A | 2/1995 | Majors | |
| 5,433,011 A | 7/1995 | Scarborough et al. | |
| 6,041,510 A | 3/2000 | Huff | |
| 6,442,857 B1 | 9/2002 | Atsuhiko et al. | |
| 6,460,264 B1 | 10/2002 | Bos et al. | |
| 6,640,455 B1 | 11/2003 | Smothers | |
| 7,497,022 B1 | 3/2009 | Aarhus | |
| 8,104,187 B2 * | 1/2012 | Heyer | 33/375 |
| 8,407,906 B2 * | 4/2013 | Heyer | 33/375 |
| 2003/0033722 A1 | 2/2003 | Lanham | |

* cited by examiner

*Primary Examiner* — Christopher Fulton
(74) *Attorney, Agent, or Firm* — Schultz & Associates, P.C.

(57) ABSTRACT

A portable device for measuring a deflection of a surface, comprising an elongate frame having a first end and a second end and a first datum surface, a first removable reference support adjacent the first end, a second removable reference support adjacent the second end, a deflection gauge attached to the elongate frame between the first removable reference support and the second removable reference support, and wherein the deflection gauge engages and measures a deflection of the surface relative to the first removable reference support and the second removable reference support.

26 Claims, 13 Drawing Sheets

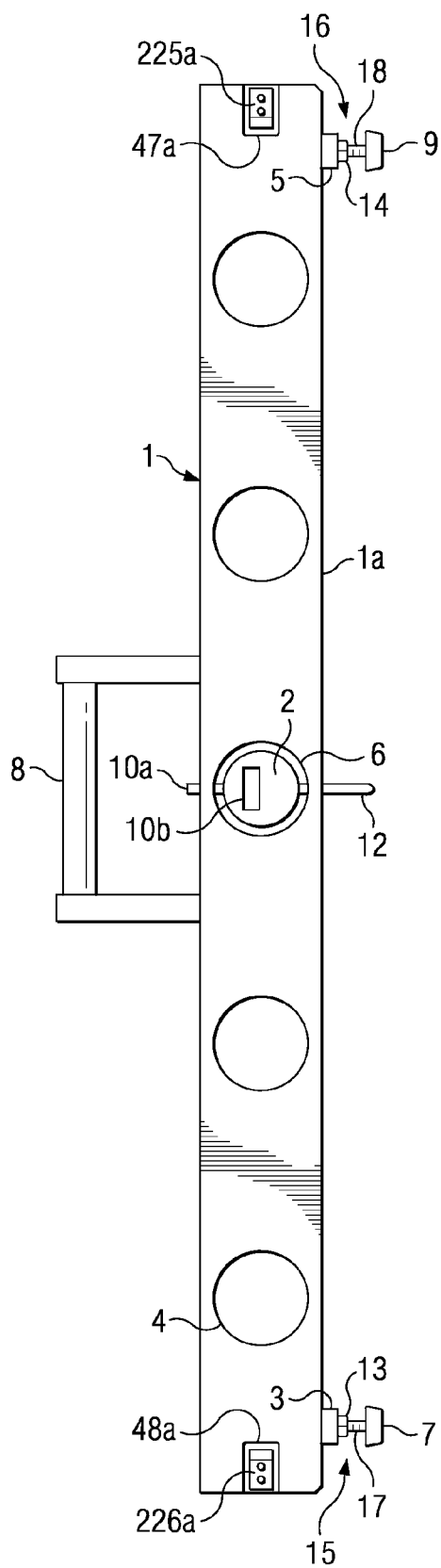
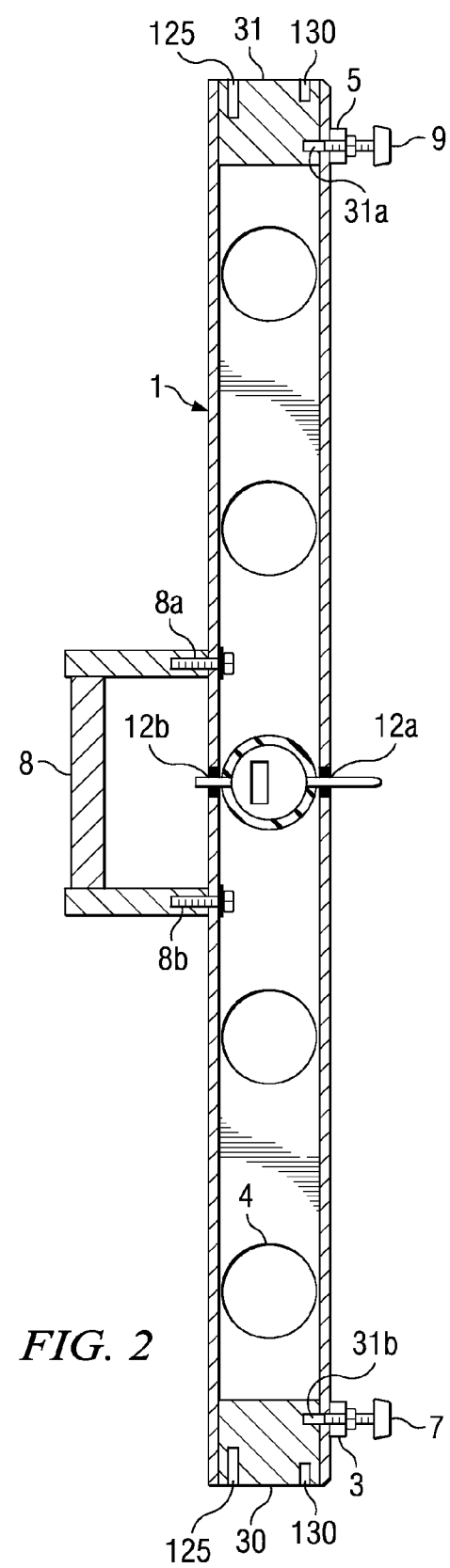
FIG. 1
FIG. 2

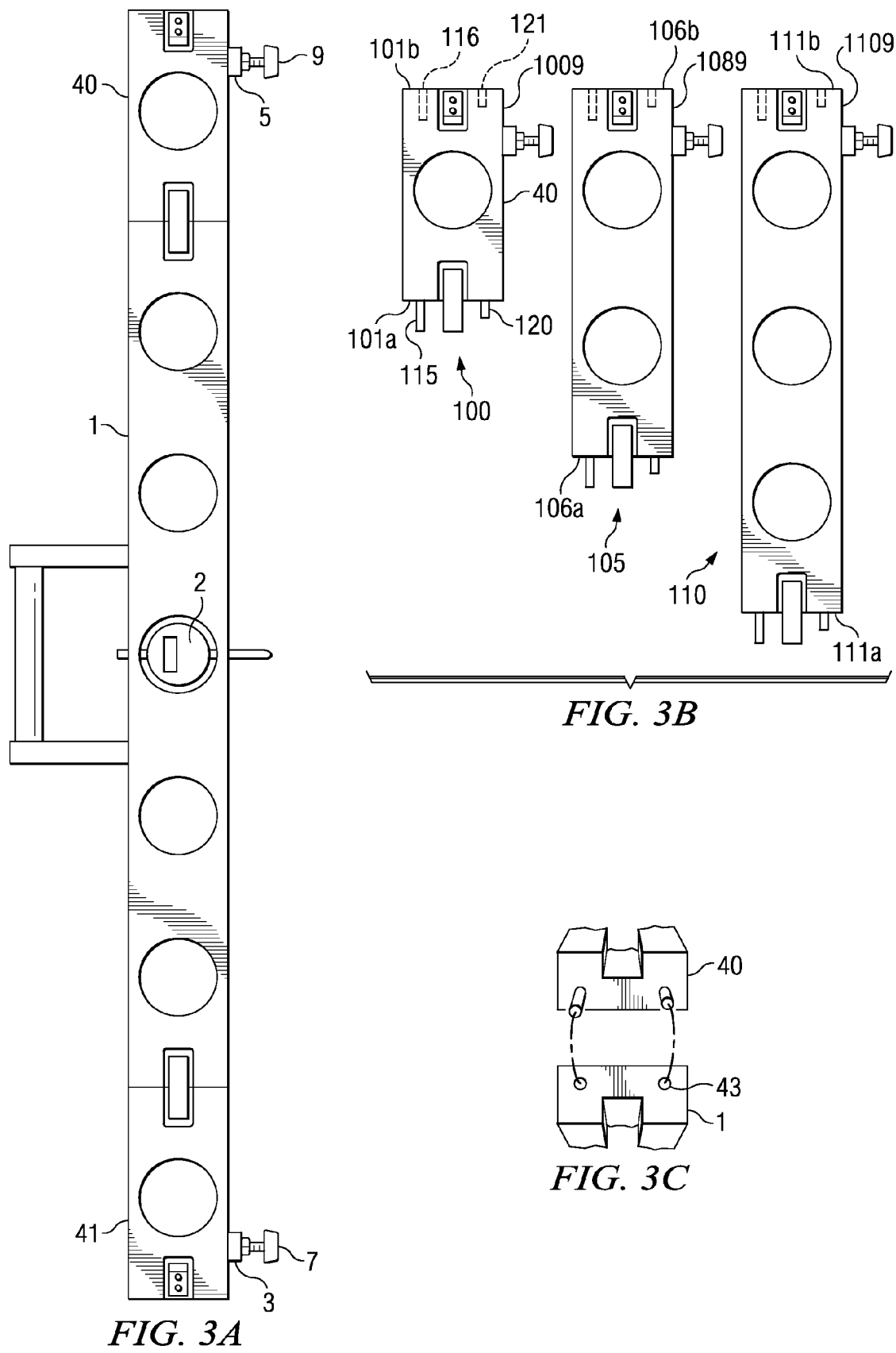
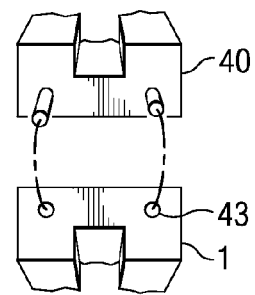

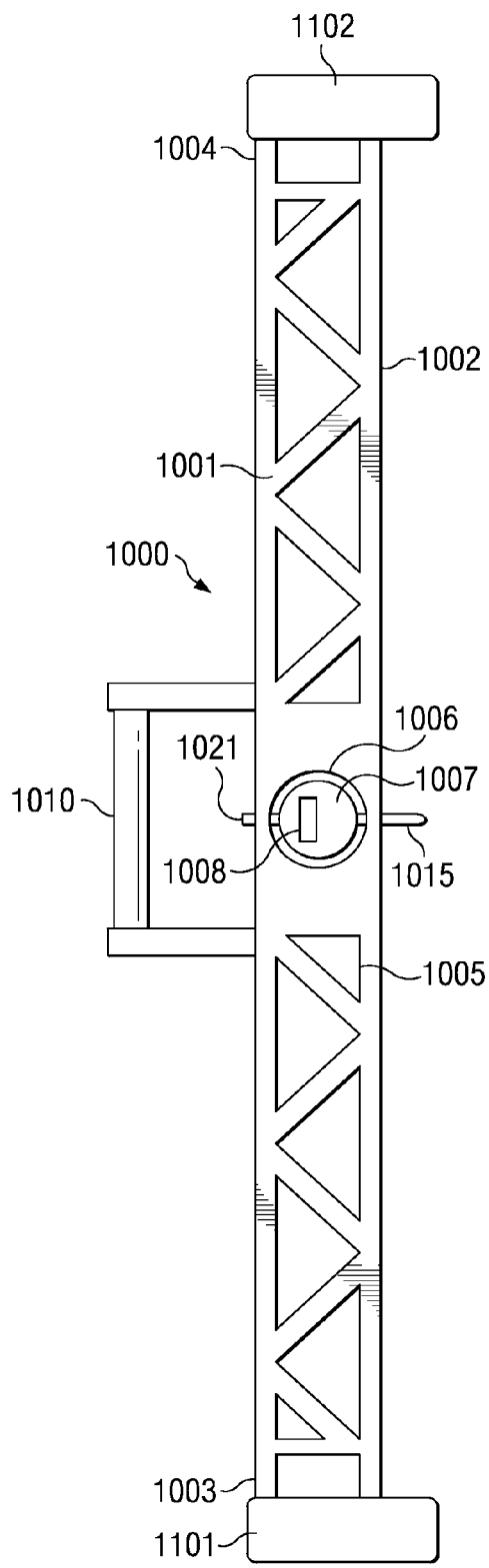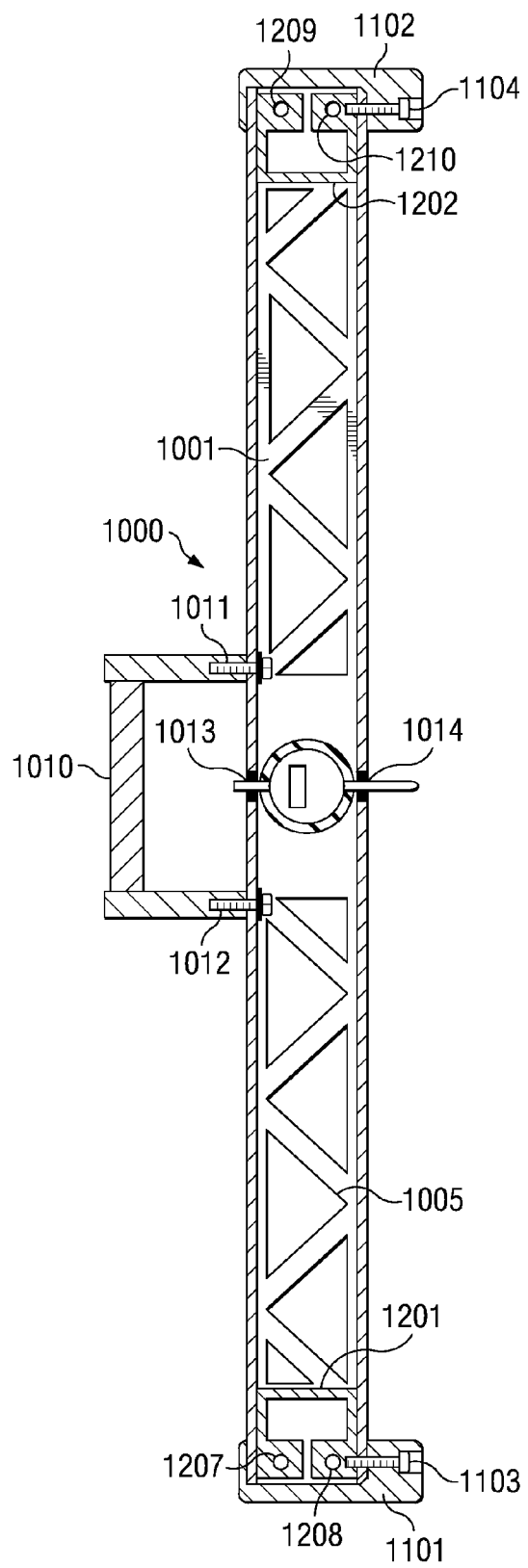
FIG. 6A
FIG. 6B

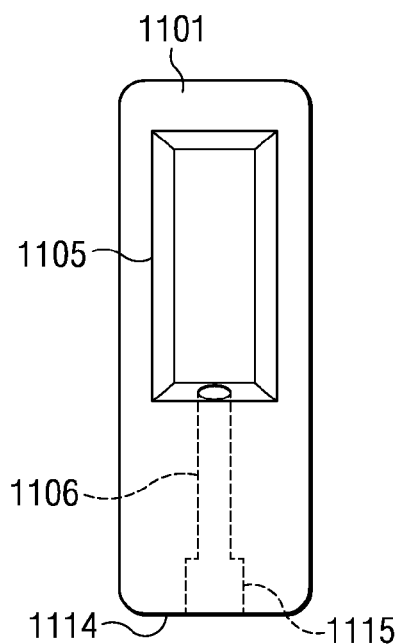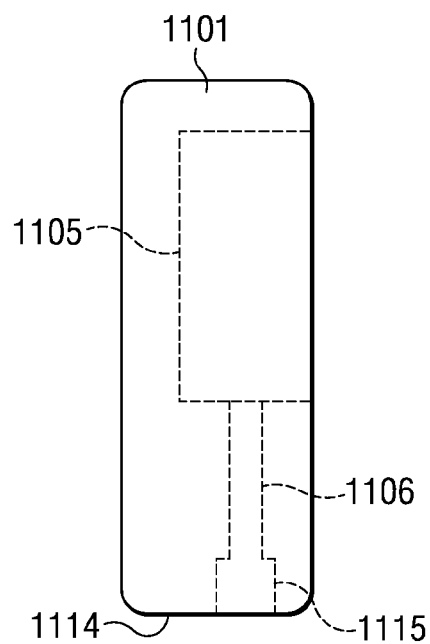
FIG. 8A  FIG. 8B
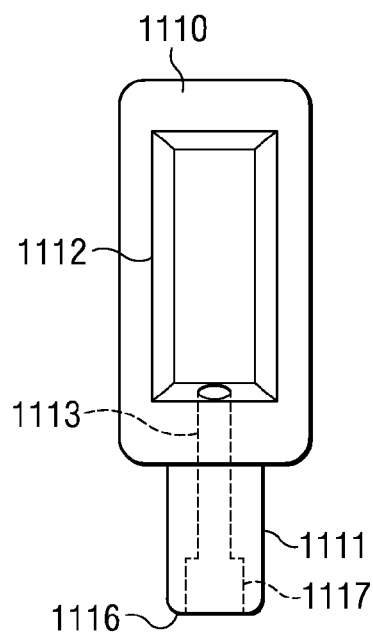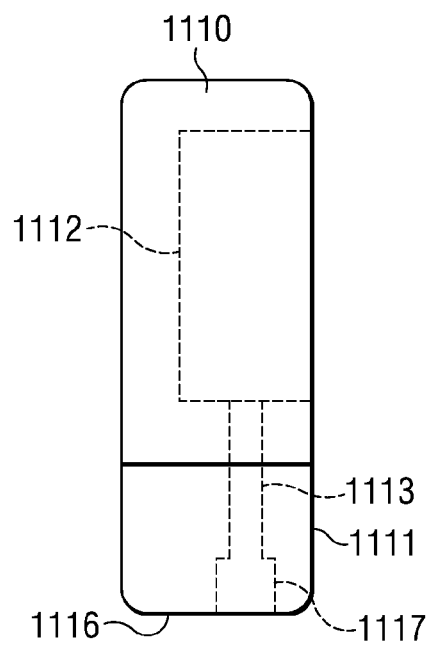
FIG. 9A  FIG. 9B

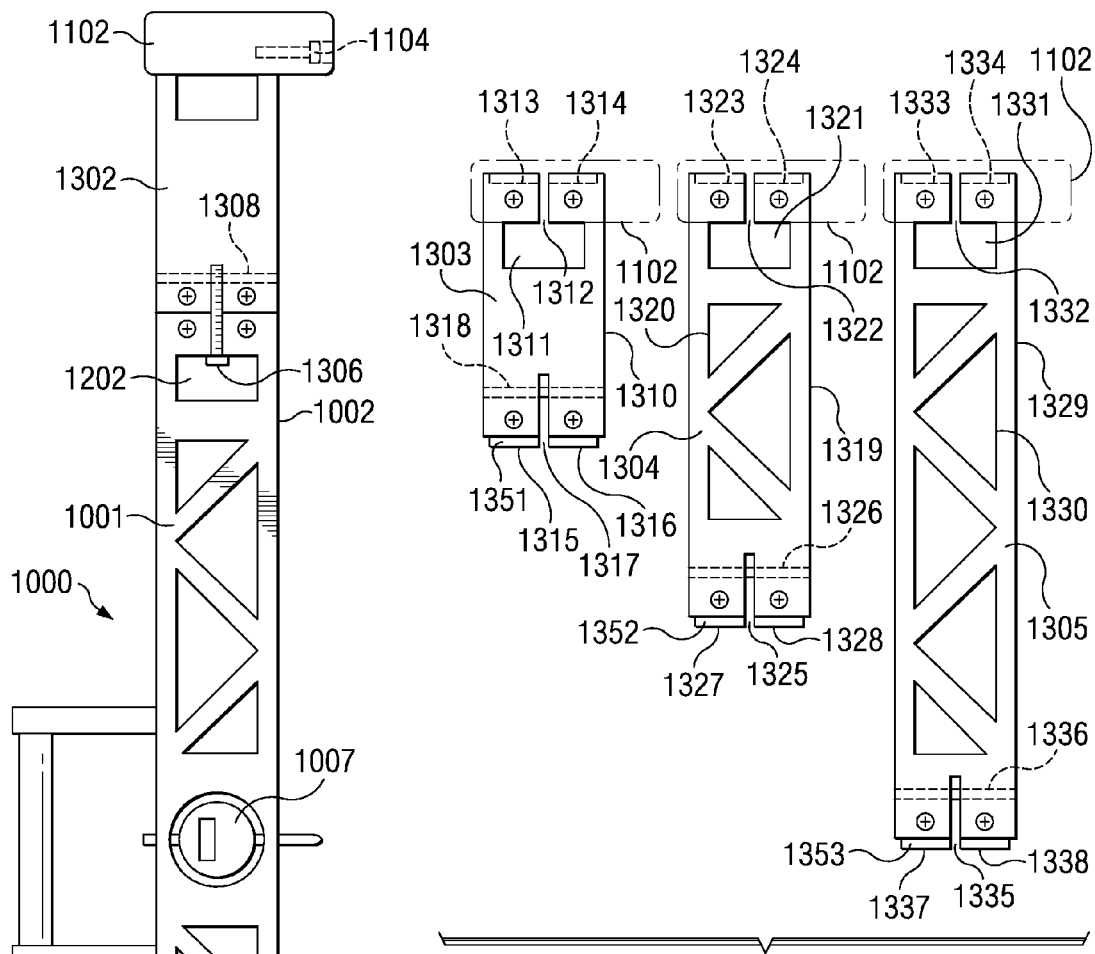
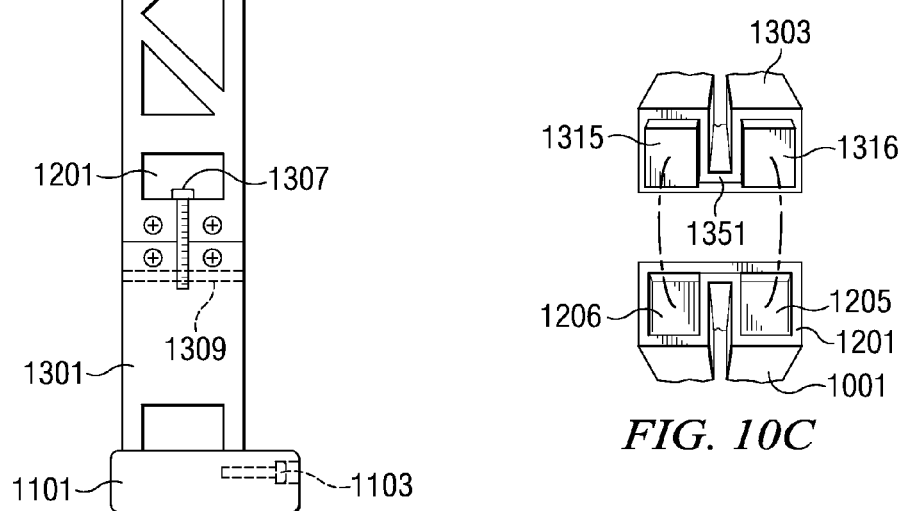
*FIG. 10A*
*FIG. 10B*
*FIG. 10C*

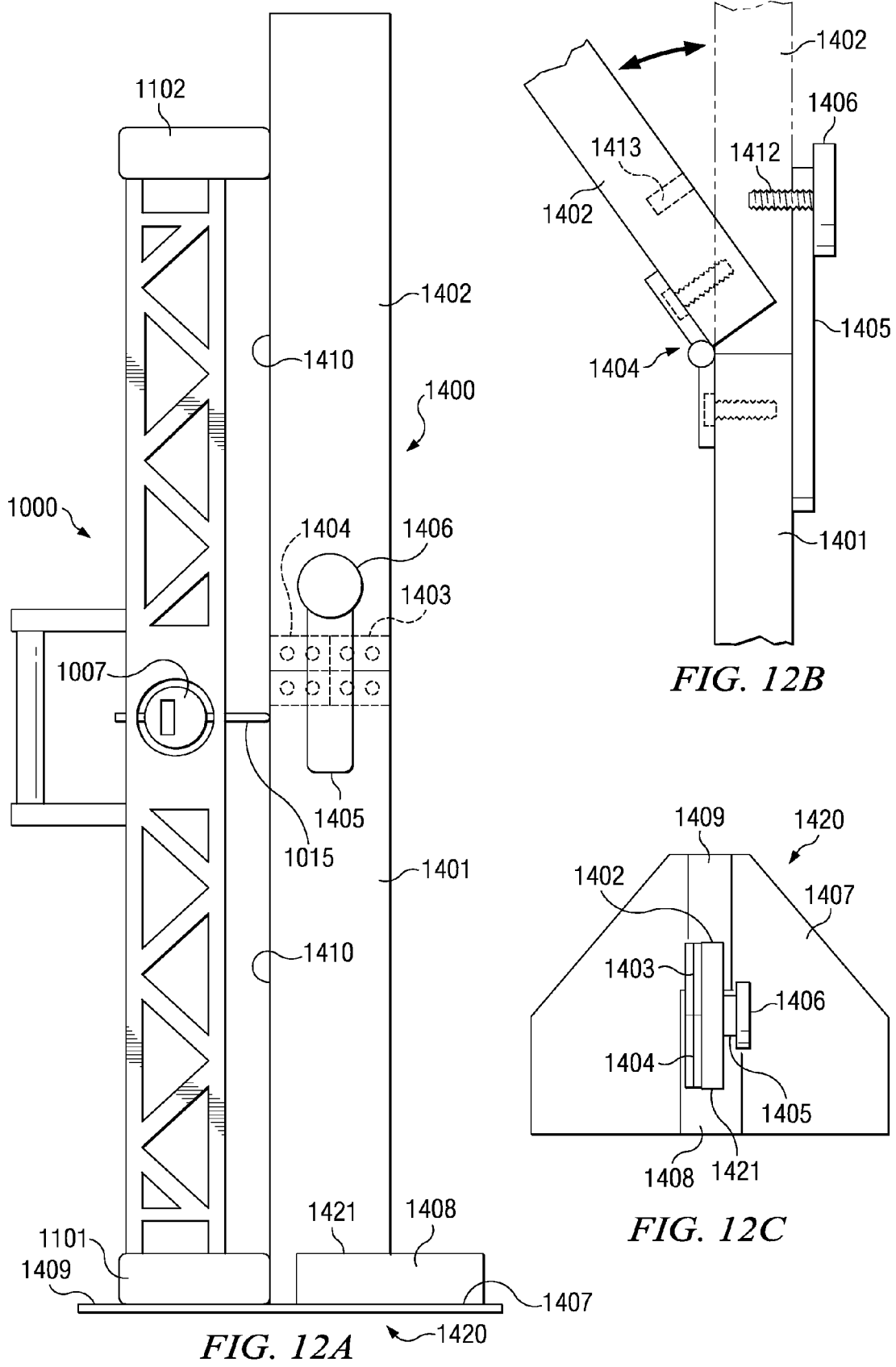

WINDOW FRAME DEFLECTION MEASUREMENT DEVICE AND METHOD OF USE

CROSS REFERENCE TO RELATED APPLICATION

This application is a continuation in part of U.S. application Ser. No. 12/590,552 filed Nov. 10, 2009, now U.S. Pat. No. 8,104,187.

FIELD OF THE INVENTION

This invention relates generally to measurement of surface deflection of vertical surfaces and, more specifically, to measurement of deflection of a window or door frame.

BACKGROUND OF THE INVENTION

In many fields, it is often necessary to measure the amount that a vertical surface or frame has been bent or deflected. Such a situation arises in disaster recovery in response to wind damage or other accidents or natural disasters. Measurement of damage is necessitated by retrofit procedures which may be required as well as insurance recovery and insurance adjustment.

One of the major problems in measuring the deflection over longs spans, such as in large window frames, is the lack of convenient, portable tools to measure the deflection. A typical tool available is a mason's bubble level as well known in the art. A bubble level determines whether a surface is level and plumb (truly vertical or horizontal), but does not quantify the deflection of the surface.

For example, U.S. Pat. No. 5,388,338 to Majors discloses an expandable screed level. The level has an open rectangular cross section and uses liquid bubble levels to determine slope. The device is expandable by adding additional sections at either end. The additional sections attach by means of a smaller rectangular cross section that fits inside the main body. The additional sections are retained in position by use of a latching mechanism. However, Majors makes no provision for measuring the displacement of a warp in a frame.

U.S. Pat. No. 5,433,011 to Scarborough et al., discloses an expandable level. The level is expandable as a straight level, a square, a T-square and other shapes. Additional sections are added to the main body through a tongue and groove arrangement. A pressure screw is tightened to lock the pieces together. The device measures slope through use of liquid bubble levels. Each expansion piece contains at least one level. However, no provision for measuring deflection of a frame is provided.

U.S. Pat. No. 4,939,848 to Armstrong discloses an improved alignment gauge to check misalignment of the body of a vehicle. The device determines the distance between various physical points on the vehicle in order to aid in proper alignment. The device consists of a needle indicator attached at one end of a beam. The beam supports a horizontal and vertical liquid bubble level. The Armstrong device produces a precise result, but does not address the problems of ease of transport and use. Further, the device does not measure deflection along a long linear surface, but rather at specific points.

U.S. Pat. No. 7,497,022 to Aarhus discusses an extendible level. Telescopic extensions are contained within a main body of the level extension. Each terminates in an end piece. The extensions are supported by cross members. Each cross member and the main body includes a liquid bubble level. The device facilitates viewing but does not measure depth or deflection.

U.S. Publication No. 2003/0033722 to Lanham discloses a telescopic leveling instrument having a body and telescopic extensions. The telescopic extensions are oriented horizontally or vertically. The extensions are marked to allow distance measurement. The main body includes a bubble level. The device measures distance but does not measure depth or deflection perpendicular to the surface.

U.S. Pat. No. 5,303,480 to Chek discloses a device to measure the amount of deviation of a patient's facial symmetry from a "standardized norm." The device consists of a rod shaped base and a portable probe that is movable horizontally. The base is placed against a patient's sternum and maintained at horizontal by monitoring a liquid bubble level. The probe is then set against various facial features and the horizontal and radial distance from the sternum to the probe is measured. However, the device does not provide a means to measure depth between two points on a particular surface or over long distances. Further, the device is incapable of measuring multiple points of deflection at the same time.

U.S. Pat. No. 4,691,443 to Hamilton et al., discloses a vehicle alignment system. The system includes fittings connected to beams that allow access to a vehicle, while maintaining the measurement surfaces in horizontal or vertical orientation. Lasers are used to project X, Y and Z coordinates. The device is not portable. The device also does not provide a means to measure deflection of a freestanding vertical beam.

U.S. Pat. No. 5,388,338 to Majors describes an extendible screed level. The level includes extensions that mount to a main body. The extensions enter a channel in the main body and are locked into position with releasable catches. The extensions produce an increase in length that allows the level to span retaining walls of various widths, forming a barrier to hold wet cement. The level of Majors includes a bubble level to ensure the surface of the wet cement is horizontal. However, Majors does not provide for determining a measurement of deflection of vertical surfaces.

Further, the prior art does not address the problem in measuring deflection in a vertical beam by a single individual. Often the window frames are quite large, requiring spanning eight or more feet in order to determine the deflection. It is difficult and unwieldy for a single individual to hold prior art levels against such a window frame and measure the deflection accurately or consistently.

Therefore, a need exists for an economical device for measuring deflection of large surfaces, including window frames, which can be operated single-handedly. A need also exists for a deflection measurement device which is portable and may be used in the field. Still further, a need exists for a simple uncomplicated device to measure deflection of a vertical beam at or around its center point. A further need exists for a device which is expandable to fit both large and small spans, without the need for additional tooling or calibration. A still further need exists for a device to measure many points of deflection over a surface simultaneously between a pair of reference points.

SUMMARY OF THE INVENTION

In one embodiment, the measurement device comprises an elongate frame having an adjustable reference assembly located at each end. A gauge is centrally located in the elongate frame and positioned to measure a deflection from two calibrated reference assemblies. A centrally located handle is provided for ease of use, allowing a single individual to hold the device and manipulate the measurement gauge.

Expansion sleeves are provided that attach precisely and rigidly to each end of the frame in order to expand the span of the measurement device. The reference assemblies are then removed and placed at the end of the additional lengths. The reference assemblies are designed and constructed so that re-calibration is not required. In another embodiment, the additional lengths incorporate additional pre-calibrated reference assemblies.

In another embodiment, the deflection at several locations along a given frame may be measured by repositioning the elongate frame, or, in another embodiment, by employing several gauges simultaneously.

In another embodiment, the measurement device comprises an elongate frame having a reference support attached to each end. A deflection gauge is centrally located in the elongate frame and positioned to measure a deflection with respect to the two reference supports. A centrally located handle is provided for ease of use, allowing a single individual to hold the measurement device and to manipulate the deflection gauge.

Extensions are provided, which attach precisely and rigidly to each end of the elongate frame in order to expand the span of the measurement device. The reference supports are then removed and placed at the ends of the extensions. In another embodiment, the additional extensions incorporate additional reference supports.

A calibration bar is provided to calibrate the measurement device. The calibration bar is assembled in multiple pieces, which are hingedly connected to each other and each are secured with a stabilizer bar and a securing knob. The calibration bar further comprises a stand to maintain the calibration bar generally perpendicularly to the stand and to facilitate calibration of the measurement device.

A rack is provided having a first planar member and a second member, which are hingedly connected to each other. Each planar member has a plurality of slots, which are adapted to receive the measurement device. In use, a pair or more of these racks are employed to hold and to transport the measurement device. The racks keep the reference supports and the probe of the gauge from contacting other surfaces, thereby protecting the gauge and reference supports from damage and extending their usable life.

BRIEF DESCRIPTION OF THE DRAWINGS

The disclosed embodiments will be described with reference to the accompanying drawings. Like pieces in different drawings carry the same number.

FIG. 1 is a side view of a preferred embodiment.

FIG. 2 is a partial section side view of a preferred embodiment.

FIG. 3a is a side view of a preferred embodiment that includes expansion sleeves.

FIG. 3b is a side view of several expansion sleeves of different lengths.

FIG. 3c is an assembly view of the elongate frame and an expansion sleeve.

FIG. 6A is a side view of a preferred embodiment.

FIG. 6B is a partial section side view of a preferred embodiment.

FIG. 8A is an end view of a reference support of a preferred embodiment.

FIG. 8B is a side view of a reference support of a preferred embodiment.

FIG. 9A is an end view of a reference support of a preferred embodiment.

FIG. 9B a side view of a reference support of a preferred embodiment.

FIG. 10A is a side view of a preferred embodiment with a pair of extensions.

FIG. 10B is a side view of several extensions of different lengths.

FIG. 10C is an assembly view of the elongate frame and an extension of a preferred embodiment.

FIG. 12A is a side view of a preferred embodiment resting against a calibration bar of a preferred embodiment.

FIG. 12B is a partial side view of a calibration bar of a preferred embodiment.

FIG. 12C is a top view of a calibration bar of a preferred embodiment.

DETAILED DESCRIPTION

Figure 3D:
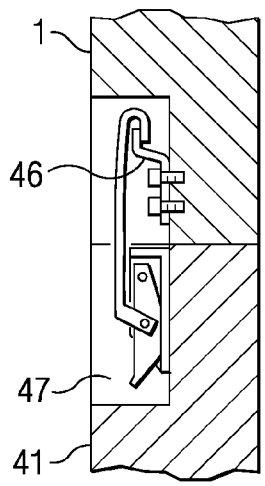
FIG. 3d is a partial section view of the elongate frame and an expansion sleeve.

Referring to FIGS. 1 and 2, the measurement device includes elongate frame 1. Elongate frame 1 is a rectangular tube having a base length of approximately three feet. Bottom surface 1a of elongate frame 1 in a preferred embodiment is machined flat. The flat surface forms a first datum surface. Elongate frame 1 has a plurality of weight reduction holes 4. Mounting hole 6 is supplied for mounting of gauge 2. End caps 30 and 31 are solid aluminum billets that are sized to fit precisely into the ends of the rectangular channel of elongate frame 1.

In a preferred embodiment, the end caps are epoxied in place and machined flat and perpendicular to bottom surface 1a. The end caps are perpendicular to bottom surface 1a. End caps 30 and 31 each contain holes 31a and 31b, sized to receive reference assemblies 15 and 16. End caps further include guide holes 125 and 130. Recesses 47a and 48a are located at each end of elongate frame 1. Catch support 225a resides in recess 47a. Catch support 226a resides in recess 48a.

In a preferred embodiment, elongate frame 1 may be made from an extrusion, milled from stock or cast. An aluminum magnesium alloy is preferred for cost and weight considerations. However, elongate frame 1 may be constructed of other rigid materials capable of maintaining a very low central beam deflection for moderate to light loads, on the order of 25 pounds. Lighter weight materials are preferred. For extremely high precision applications, stainless steel or titanium may be employed, resulting in extremely low deflections over large spans. Cross sectional shapes can vary. In a preferred embodiment, an "I" beam extrusion is employed having the highest rigidity to weight ratio available. Rectangular and box extrusions are also preferred as having high rigidity.

Handle 8 extends from the center of elongate frame 1. The handle is centrally positioned between the reference assemblies to provide equal pressure to the reference assemblies when in use and to facilitate ease of positioning. Handle 8 is attached to the elongate frame 1 using screws 8a and 8b passing through the inside of elongate frame 1 or by welding. Other methods of removable or permanent attachment may be employed as known in the art. A removable handle is preferred to aid in compact storage for shipment.

Gauge 2 is operatively positioned in mounting hole 6. Gauge 2 includes probe 12, retention knob 10a, and data read out 10b. Probe 12 extends radially from the bottom of gauge 2 through access hole 12a in elongate frame 1. Hole 12a is sized to avoid interference with the radial movement of probe 12. Retention knob 10a extends radially through access hole 12b in the top of elongate frame 1. Access hole 12b is sized to allow free motion of retention knob 10a. Probe 12 is spring loaded to facilitate ease of use. Retention knob 10a follows the movement of probe 12. Retention knob 10a secures probe 12 to gauge 2 preventing over-extension or loss of probe 12 due to the spring.

In a preferred embodiment, gauge 2 is a 543-683B electronic digital indicator manufactured by Mitutoyo of Tokyo, Japan. Another viable option is a depth gauge manufactured under part number CEN44345 and offered for sale by Central Tools/Central Lighting. In another embodiment, gauge 2 can include an electronic memory including time and date indexing so that the time and date of measurements taken can be recorded. Furthermore, gauge 2 may include a memory for alphanumeric tagging of each measurement so that notes may be made as to the location of the window frame being measured. In this embodiment, electronic downloading of this data is provided to a laptop computer for later use. An RFID tag may be applied to the physical window frame corresponding to the deflection tagging for later positive location and correlation with the deflection measurement.

In another embodiment, gauge 2 is an optical or acoustic distance measuring device. An example of an optical measuring device is Leica Disto's model 740690, which measures distance via a laser. An example of an acoustic measuring device is the Intellimeasure model 77-018 from Stanley Tools, which measures distance via ultrasonic waves. Other such measuring devices are known in the art and may include wireless data capture via a computer. Gauge 2 may also include a button to zero the readout at a given height during calibration.

While preferred embodiments of this device are described as having a manually adjustable gauge, other gauges and measurement devices may be utilized. Further, seals for moving parts are not required for all uses and types of gauges.

Referring to FIG. 3a, the span of the measurement device may be increased by adding extensions 40 and 41 to each end of elongate frame 1. Referring to FIG. 3b, in a preferred embodiment, extensions 100, 105, and 110 are different lengths of 3 inches, 6 inches and 12 inches, respectively. Other lengths of extensions may be utilized. Extensions 100, 105 and 110 are constructed of hollow rectangular channel having solid ends 101a and 101b, 106a and 106b, and 111a and 111b. The solid ends are epoxied into each end of each extension, respectively. Bottom surfaces 1009, 1089, and 1109 are each machined flat to match bottom surface 1a of elongate frame 1. The bottom surfaces form datum surfaces for calibration. Each solid end is also machined to be perpendicular with the bottom surfaces.

Each extension includes a set of guide pins 115 and 120 and a set of guide holes 116 and 121. Guide holes 116 and 121 are sized to provide a close fit with guide pins 115 and 120. Guide pins 115 and 120 are different diameters and different lengths so that the extensions may be assembled with the elongate frame in the proper orientation.

Referring to FIG. 3c, the guide pins are engaged with corresponding guide holes until one or more extensions meets elongate frame 1. The extensions are attached to the elongate frame singularly or in groups, thereby variably extending the length spanned by the device.

Figure 4:
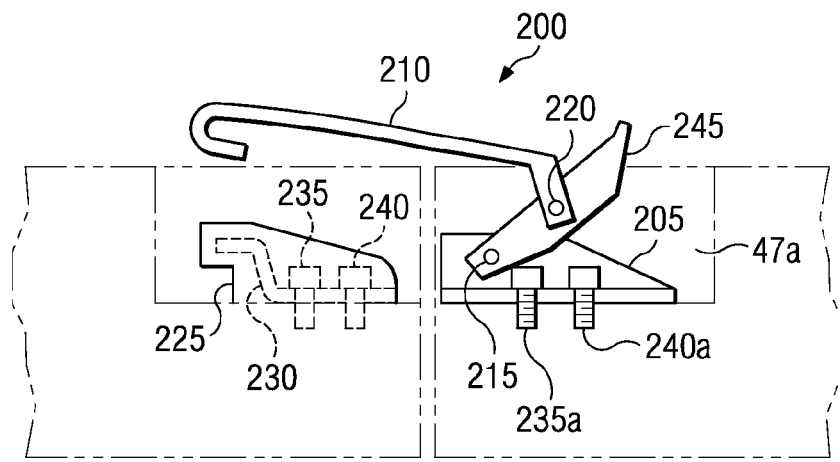
FIG. 4 is a detail view of a latch mechanism.

Referring to FIGS. 3d and 4, an extension is removably engaged with elongate frame 1 with latch assembly 200. Toggle arm 245 is advanced allowing latch 210 to engage catch 230. Toggle arm 245 is then rotated forcing latch 210 under catch support 225, thereby releasably securing the extension to the elongate frame.

Toggle support 205 resides in recess 47a located on each extension. Toggle support 205 is secured in recess 47a with bolts 235a and 240a. Toggle arm 245 is pivotally supported by toggle support 205 through hinge pin 215. Toggle arm 245 includes toggle pin 220 which pivotally supports latch 210. Each catch support is secured to the elongate frame by way of retaining screws 235 and 240. Each catch support includes a catch 230.

By way of example, FIG. 4 shows the construction of catch support 226a and catch 230 as well as the location of the retaining screws 235 and 240. Catch support 226a and catch 230 are formed from stamped steel plate in a preferred embodiment.

Figure 3E:
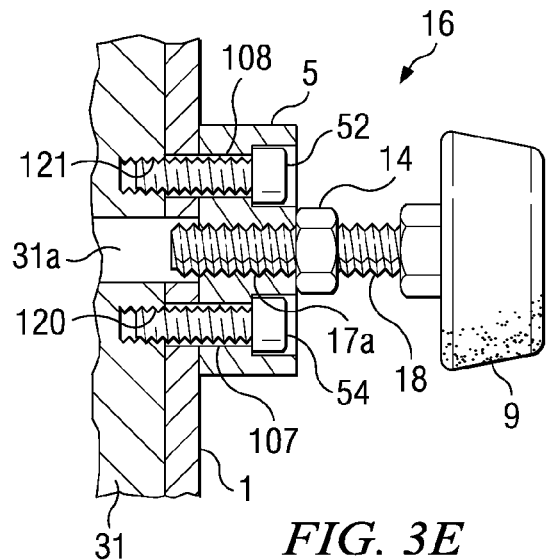
FIG. 3e is a partial section view of the adjustable reference assembly.
Figure 3F:
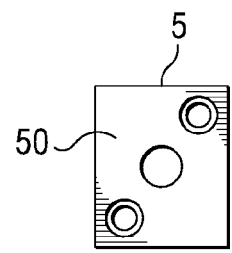
FIG. 3f is a top view of a mounting block.

Referring to FIGS. 3e and 3f, reference assemblies 15 and 16 are attached to elongate frame 1. Elongate frame 1 also includes a set of threaded holes for receiving mounting screws for reference assemblies 15 and 16. The threaded holes are shown by way of example in FIG. 3e as 120 and 121. Reference assemblies 15 and 16 include mounting blocks 3 and 5. Referring to FIG. 3f by example, top surface 50 of mounting block 5 is machined flat to match the bottom surface 1a of the elongate frame. The flat surfaces form second and third datum surfaces from which the device is calibrated. Mounting blocks 3 and 5 are removably attached to elongate frame 1. Mounting blocks 3 and 5 include holes 107 and 108. Bolts 52 and 54 pass through holes 107 and 108 in mounting blocks 3 and 5 and thread into holes 120 and 121 in end cap 31. Each mounting block includes a threaded hole shown as 17a for receiving a threaded contact support 18. Threaded contact support 18 is retained in threaded hole 17a by locking nut 14. The threads are standard ASTM pitch. In high precision embodiments, threads with lesser pitch may be employed.

Each reference assembly further includes contact pad, shown by example as 9. In a preferred embodiment, each contact pad includes a flexible neoprene gasket. In other embodiments requiring greater accuracy, each contact pad may be comprised of a suitable rigid material such as nylon, Delrin, aluminum or polished stainless steel. In applications where static discharge or contact with high voltage is a concern, the contact assemblies can be formed of bakelite or asbestos.

In a preferred embodiment, when extensions are added, the mounting blocks, along with contact assemblies 15 and 16 are removed from elongate frame 1 and attached to an extension by use of threaded bolts 52 and 54. Movement of contact supports 17 and 18 with respect to mounting blocks 3 and 5 is not required, and their calibrated height is retained by locking nut 14. Thus, relocation of contact assemblies 15 and 16 onto the extension without recalibration of gauge 2 is accomplished. Other extensions are added in a similar manner.

In another embodiment, each extension includes a pre-calibrated reference assembly in relation to elongate frame 1.

Figure 5:
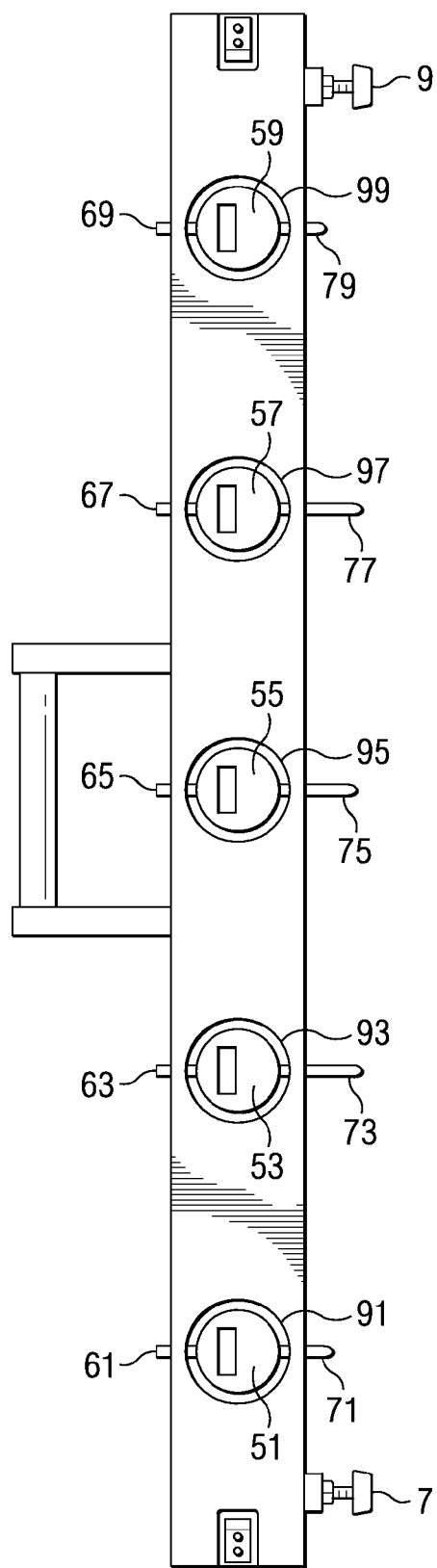
FIG. 5 is a side view of an alternative embodiment.

Referring to FIG. 5 in another embodiment, the measurement device is configured to simultaneously take multiple measurements, such as when a vertical surface has been deflected in more than one plane and/or in more than one location. In this embodiment, gauges 51, 53, 55, 57, and 59 reside in holes 91, 93, 95, 97, and 99, respectively. Each gauge includes a retention knob 61, 63, 65, 67, and 69, respectively, and probe 71, 73, 75, 77, and 79, respectively.

Referring to FIGS. 6A and 6B in another embodiment, measurement device 1000 includes elongate frame 1001. Elongate frame 1001 is a hollow rectangular tube having a base length of approximately 2 feet. Other lengths may be employed. Datum surface 1002 of elongate frame 1001 is machined flat. Elongate frame 1001 further has a plurality of weight reduction holes 1005, first end 1003, and second end 1004. Handle 1010 is centrally positioned on elongate frame 1001 and secures to elongate frame 1001 with fasteners 1011 and 1012.

Gauge 1007 is positioned in gauge hole 1006 at a central location in elongate frame 1001. Gauge 1007 includes probe 1015, retention knob 1021, and data readout 1008. Probe 1015 extends generally radially from the bottom of gauge 1007 through access hole 1014 in elongate frame 1001. Hole 1014 is sized to avoid interference with the radial movement of probe 1015. Retention knob 1021 extends generally radially through access hole 1013 at the top of elongate frame 1001. Access hole 1013 is sized to allow free motion of retention knob 1021. Probe 1015 is spring-loaded to facilitate ease of use. Retention knob 1021 follows the movement of probe 1015. Retention knob 1021 secures probe 1015 to gauge 1007, preventing over-extension or loss of probe 1015 due to the spring.

In a preferred embodiment, elongate frame 1001 may be made from an extrusion, milled from stock or cast. An aluminum magnesium alloy is preferred for cost and weight considerations. However, elongate frame 1001 may be constructed of other rigid materials capable of maintaining a very low central beam deflection from moderate to light loads, on the order of 25 lbs. Lighter weight materials are preferred. For extremely high precision applications, stainless steel or titanium may be employed, resulting in extremely low deflections over large spans. In a preferred embodiment, elongate frame 1001 is hard coat anodized. Other treatments with similar corrosion-resistant effects may be employed. Cross-sectional shapes can vary. In a preferred embodiment, a truss-like pattern is machined into elongate frame 1001 to maintain a high rigidity to weight ratio.

In a preferred embodiment, handle 1010 is removably secured to elongate frame 1001. A removable handle is preferred to aid in storage for shipment. Handle 1010 is padded to facilitate ease of use. In other embodiments, welding or other methods of removable or permanent attachment as known in the art may be employed.

In a preferred embodiment, gauge 1007 is a 543-683B electronic digital indicator manufactured by Mitutoyo of Tokyo, Japan. Another option is a depth gauge manufactured under part number CEN44345 and offered for sale by Central Tools/Central Lighting. In a preferred embodiment, gauge 1007 can include an electronic memory, including time and date indexing, so that the time and date of measurements taken can be recorded. Furthermore, gauge 1007 may include a memory for alphanumeric tagging of each measurement so that notes may be made as to location of the window frame being measured. In this embodiment, electronic downloading of this data is provided to a laptop computer for other use. An RFID tag may be applied to the physical window frame corresponding to the deflection tagging for a later positive location and correlation of the deflection measurement.

In other embodiments, gauge 1007 is an optical or acoustic distance measuring device. For example, an optical measuring device is Leica Disto's Model 704690, which measures distance with a laser. For example, an acoustic measuring device is the Intellimeasure Model 77-018 from Stanley Tools, which measures distance with ultrasonic waves. Other such measuring devices known in the art may include wireless data capture with a computer. Gauge 1007 may also include a button to zero readout 1008 at a given height during calibration. It will be appreciated by those skilled in the art that other gauges and measurement tools may be utilized.

End caps 1201 and 1202 are sized to insert into first end 1003 and second end 1004 of elongate frame 1001, respectively. Reference supports 1101 and 1102 are removably secured to end caps 1201 and 1202 with reference fasteners 1103 and 1104, respectively. End cap 1201 has hole 1207 and hole 1208. End cap 1202 has hole 1209 and hole 1210.

Figure 7A:
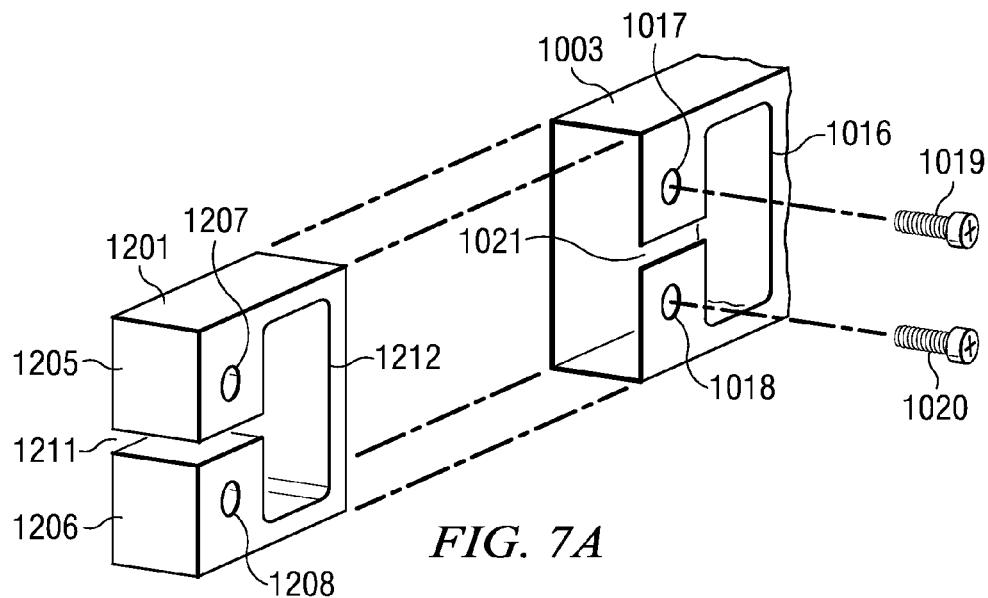
FIG. 7A is an exploded isometric view of an end cap of a preferred embodiment.

Referring to FIG. 7A by way of example, end cap 1201 inserts into first end 1003 of elongate frame 1001. Recesses 1205 and 1206 of end cap 1201 are formed by the edge of end cap 1201 positioned inside first end 1003. First end 1003 has access hole 1016, hole 1017, hole 1018, and slot 1021. End cap 1201 has access hole 1212 to align with access hole 1016. End cap 1201 further has holes 1207 and 1208 to align with holes 1017 and 1018, respectively. End cap 1201 has slot 1211 to align with slot 1021. Fasteners 1019 and 1020 insert through holes 1017 and 1018 and secure into holes 1207 and 1208.

Figure 7B:
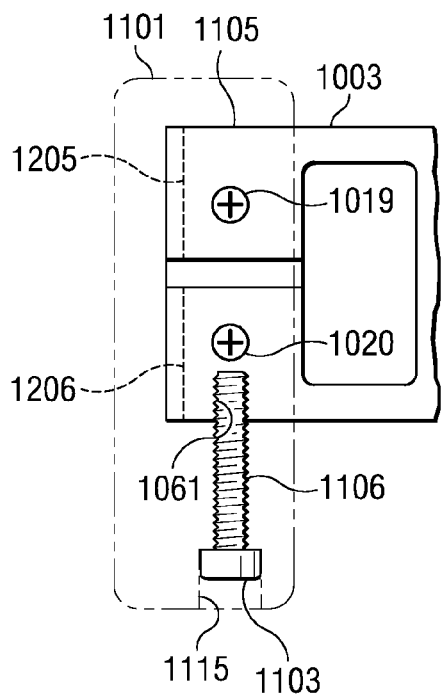
FIG. 7B is a side view of an end cap secured to an elongate frame of a preferred embodiment and a reference support removably secured to an elongate frame of a preferred embodiment.

Referring to FIG. 7B by way of example, once end cap 1201 is secured to first end 1003, reference fastener 1103 inserts into hole 1106 of reference support 1101 to threadingly engage with hole 1061 to removably secure reference support 1101 to first end 1003 of elongate frame 1001. Hole 1115 is adjacent to hole 1106, thereby allowing reference fastener 1103 to be countersunk into reference support 1101. Reference support 1101 has hole 1105 to slidingly engage with first end 1003.

Figure 7C:
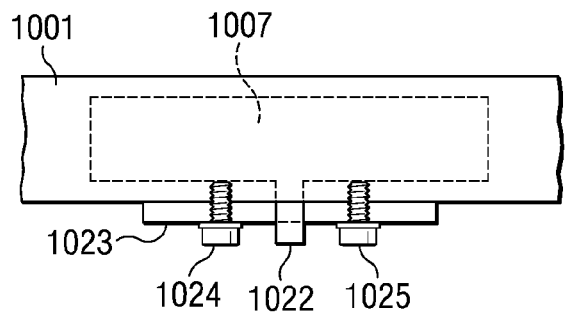
FIG. 7C is a top view of a deflection gauge and securing pin.

Referring to FIG. 7C, gauge 1007 has extension 1022 that extends out of elongate frame 1001. Pin 1023 slides through a hole in extension 1022 adjacent to elongate frame 1001 and is secured to elongate frame 1001 with fasteners 1024 and 1025.

In a preferred embodiment, end caps 1201 and 1202 are made of machined aluminum. Other materials with similar weight and strength properties may be employed.

In a preferred embodiment, fasteners 1019, 1020, 1023, fastener 1024, fastener 1025, fasteners 1104 and 1105 are made of stainless steel. Aluminum may also be employed as a material.

Referring to FIGS. 8A and 8B in one embodiment, reference support 1101 has hole 1105 to slidingly engage with elongate frame 1001, holes 1106 and 1115, which are adapted to receive and to countersink a fastener, and datum surface 1114.

Referring to FIGS. 9A and 9B in another embodiment, reference support 1110 has hole 1112 to slidingly engage with elongate frame 1001 and holes 1113 and 1117, which are adapted to receive and to countersink a fastener. Reference support 1110 has base 1111, which allows reference support 1110 to engage narrower surfaces, and datum surface 1116.

In a preferred embodiment, reference supports 1101 and 1110 are made of a polyoxymethylene thermoplastic called Delrin. In this embodiment, reference supports 1101 and 1110 are milled from Delrin blocks. This high-density material is high abrasion-resistant and will not mar finished that it contacts. Other high-density, high abrasion-resistant materials may be employed.

Referring to FIG. 10A, elongate frame 1001 has extensions 1301 and 1302 removably attached to extend the span of measurement device 1000. Extension 1301 secures to elongate frame 1001 with extension fastener 1307 and extension pin 1309. Extension pin 1309 inserts into extension 1301 generally perpendicularly to extension fastener 1307. Extension fastener 1307 threadingly engages with extension pin 1309, thereby securing extension 1301 to elongate frame 1001. Reference support 1101 removably secures to extension 1301 with reference fastener 1103. Extension 1302 secures to elongate frame 1001 with extension fastener 1306 and extension pin 1308. Extension pin 1308 inserts into extension 1302 generally perpendicularly to extension fastener 1306. Extension fastener 1306 threadingly engages with extension pin 1308, thereby securing extension 1302 to elongate frame 1001. Reference support 1102 removably secures to extension 1302 with reference fastener 1104. Extensions 1301 and 1302 are embodiments of extension 1303.

Referring to FIG. 10B, extensions 1303, 1304, and 1305 can be secured to elongate frame 1001 singularly or in combination to extend the span of measurement device 1000. Extension 1303 has datum surface 1310 to extend datum surface 1002 of elongate frame 1001. Extension 1303 has end caps 1311 and 1351. End caps 1311 and 1351 are each secured to extension 1303 with a pair of fasteners. End cap 1311 has slot 1312, recess 1313, and recess 1314. Recesses 1313 and 1314 are formed by the edge of end cap 1311 positioned inside extension 1301. End cap 1351 has slot 1317, guide 1315, and guide 1316. Guides 1315 and 1316 are formed by end cap 1351 extending past extension 1303. Extension pin 1318 inserts into extension 1303 generally perpendicularly to slot 1317. Extension 1303 has a pair of slots that align with slots 1312 and 1317. An extension fastener inserts into slot 1317 to threadingly engage with extension pin 1318, thereby securing extension 1303 to elongate frame 1001.

Extension 1304 has a plurality of weight reduction holes 1320 and datum surface 1319. End caps 1321 and 1352 insert into extension 1304 and each secures to extension 1304 with a pair of fasteners. End cap 1321 has slot 1322, recess 1323, and recess 1324. Recesses 1323 and 1324 are formed by the edge of end cap 1321 positioned inside extension 1304. End cap 1352 has slot 1325, guide 1327, and guide 1328. Guides 1327 and 1328 are formed by end cap 1352 extending past extension 1304. Extension 1304 has a pair of slots that align with slots 1322 and 1325. Extension pin 1326 inserts into extension 1304 generally perpendicularly to slot 1325. An extension fastener inserts into slot 1325 to threadingly engage with extension pin 1326, thereby securing extension 1304 to elongate frame 1001.

Extension 1305 has a plurality of weight reduction holes 1330 and datum surface 1329. End caps 1331 and 1353 insert into extension 1305 and each secures to extension 1305 with a pair of fasteners. End cap 1331 has slot 1332, recess 1333, and recess 1334. Recesses 1333 and 1334 are formed by the edge of end cap 1331 positioned inside extension 1305. End cap 1353 has slot 1335, guide 1337, and guide 1338. Guides 1337 and 1338 are formed by end cap 1353 extending past extension 1305. Extension 1305 has a pair of slots that align with slots 1332 and 1335. Extension pin 1336 inserts into extension 1305 generally perpendicularly to slot 1335. An extension fastener inserts into slot 1335 to threadingly engage with extension pin 1336, thereby securing extension 1305 to elongate frame 1001.

In one embodiment, reference supports 1101 and 1102 are removed from the ends of elongate frame 1001 and attached to their respective extension. In another embodiment, each extension includes a reference support.

Referring to FIG. 10C by way of example, extension 1303 connects to elongate frame 1001 by guide 1315 of end cap 1351 inserting into recess 1206 of end cap 1201 and guide 1316 of end cap 1351 inserting into recess 1205 of end cap 1201.

In a preferred embodiment, extensions 1303, 1304, and 1305 are all constructed of aluminum rectangular tube. Extensions 1304 and 1305 have a plurality of weight reduction holes machined into each to save on weight. In another embodiment, extension 1303 utilizes a plurality of weight reduction holes. Other materials with similar rigidity and lightweight properties may be employed. In a preferred embodiment, extensions 1303, 1304, and 1305 are of different lengths of 3 inches, 6 inches, and 12 inches, respectively. Other lengths of extensions may be utilized. In this embodiment, extensions 1303, 1304, and 1305 are hard coat anodized to reduce corrosion. Other treatments with similar corrosion resistant effects may be employed.

In a preferred embodiment, end caps 1311, 1321, 1331, 1351, 1352, and 1353 are made of machined aluminum. Other materials with similar weight and strength properties may be employed.

In a preferred embodiment, extension pins 1318, 1326, and 1336 are made of stainless steel. Aluminum may also be employed as a material.

In a preferred embodiment, guides 1315, 1316, 1327, 1328, 1337, and 1338 are machined portions of their respective end cap.

In a preferred embodiment, recesses 1313, 1314, 1323, 1324, 1333, and 1334 are machined portions of their respective end cap.

Figure 11A:
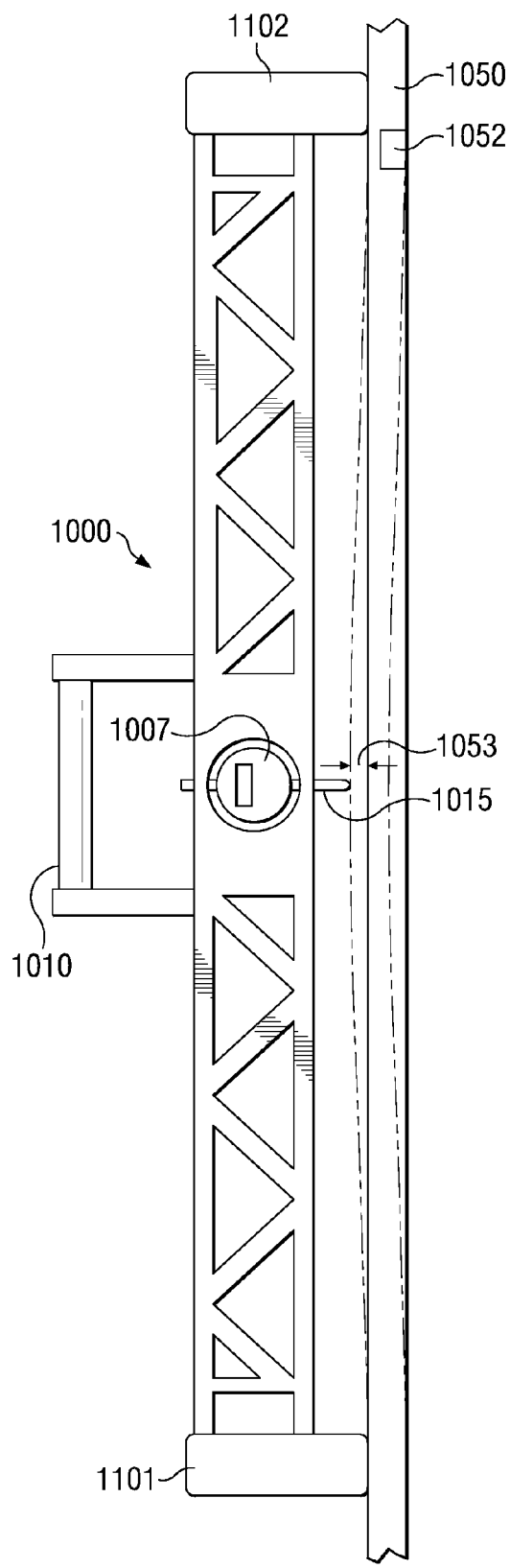
FIG. 11A is a side view of a preferred embodiment resting against a surface shown in a deflection state.
Figure 11B:
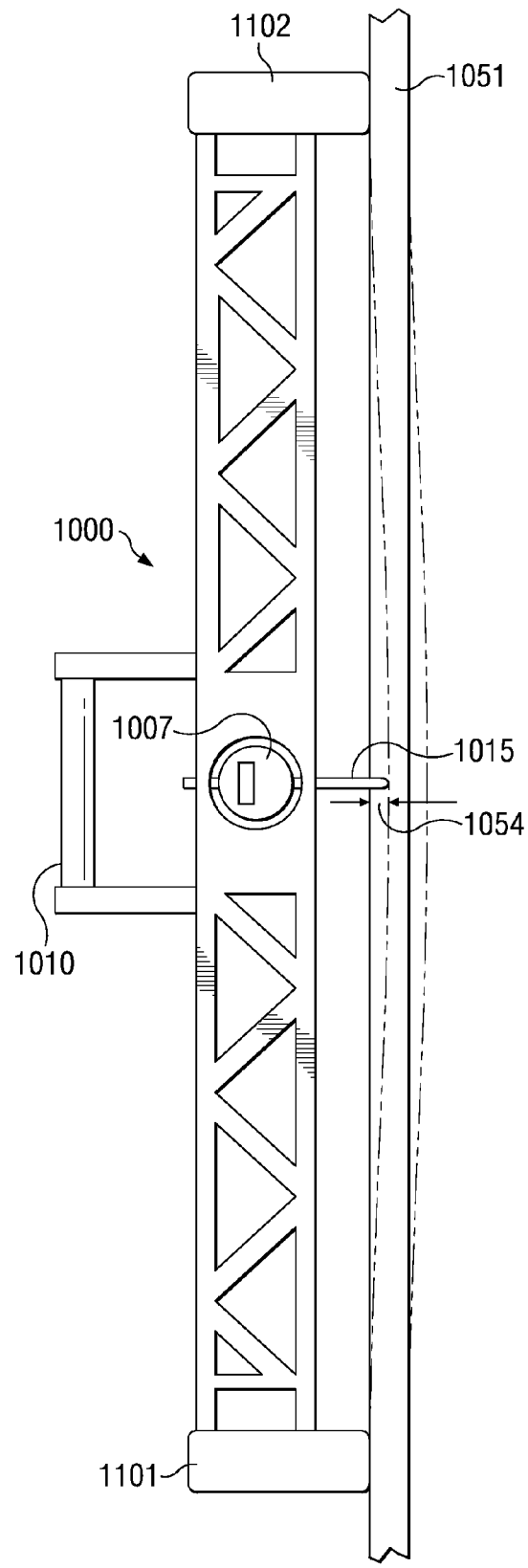
FIG. 11B is a side view of a preferred embodiment resting against a surface in a deflection state.

Referring to FIGS. 11A and 11B in use, measurement device 1000 is positioned on a vertical, free-standing surface, such as frame 1050 and frame 1051. Reference supports 1101 and 1102 are positioned on frames 1050 and 1051.

Reference supports 1101 and 1102 are located at the ends of frame 1050 and frame 1051 and are positioned by manipulating measurement device 1000 by handle 1010. Probe 1015 engages frame 1050 and frame 1051 prior to reference support 1001 and reference support 1002 and their respective datum surfaces. As reference supports 1101 and 1102 move toward frames 1050 and 1051, gauge 1007 makes a measurement. Generally, measurement device 1000 will be located so that probe 1015 meets frames 1050 and 1051 in their respective center, as this is often the area of greatest deflection.

In another embodiment, measurement device 1000 is used to measure multiple locations along the frames 1050 and 1051 by repositioning measurement device 1000 to different locations.

When gauge 1007 has been properly calibrated, a positive displacement reading will show a deflection of frame 1051 inward 1054 (away from measurement device 1000). A negative reading will show a deflection outward 1053 (toward measurement device 1000), and a reading of zero will show no deflection. Where RFID tag 1052 is to be employed, it is affixed to frame 1050, and its serial number is recorded and correlated with the deflection reading.

In a preferred embodiment, when extensions are attached to or removed from measurement device 1000, gauge 1007 is recalibrated prior to use.

Referring to FIGS. 12A, 12B, and 12C calibration bar 1400 has first portion 1401 and second portion 1402. First portion 1401 and second portion 1402 hingedly connect with hinges 1403 and 1404. First portion 1401 and second portion 1402 secure into place adjacent to each other with support 1405 and securing knob 1406. Second portion 1402 has receiving hole 1413 to threadingly accept threaded portion 1412 of securing knob 1406. Hinges 1403 and 1404 secure to first portion 1401 with a set of fasteners and secure to second portion 1402 with a set of fasteners. Other securing means known in the art may be employed. First portion 1401 and second portion 1402 form calibration surface 1410. Calibration bar 1400 is positioned generally perpendicularly to stand 1420.

Stand 1420 includes base 1407. Support 1408 is attached to base 1407. Reference surface 1409 is attached to and adjacent to base 1407. Support 1408 has slot 1421 to frictionally engage with and to position calibration bar 1400 generally perpendicularly to base 1407.

Figure 12D:
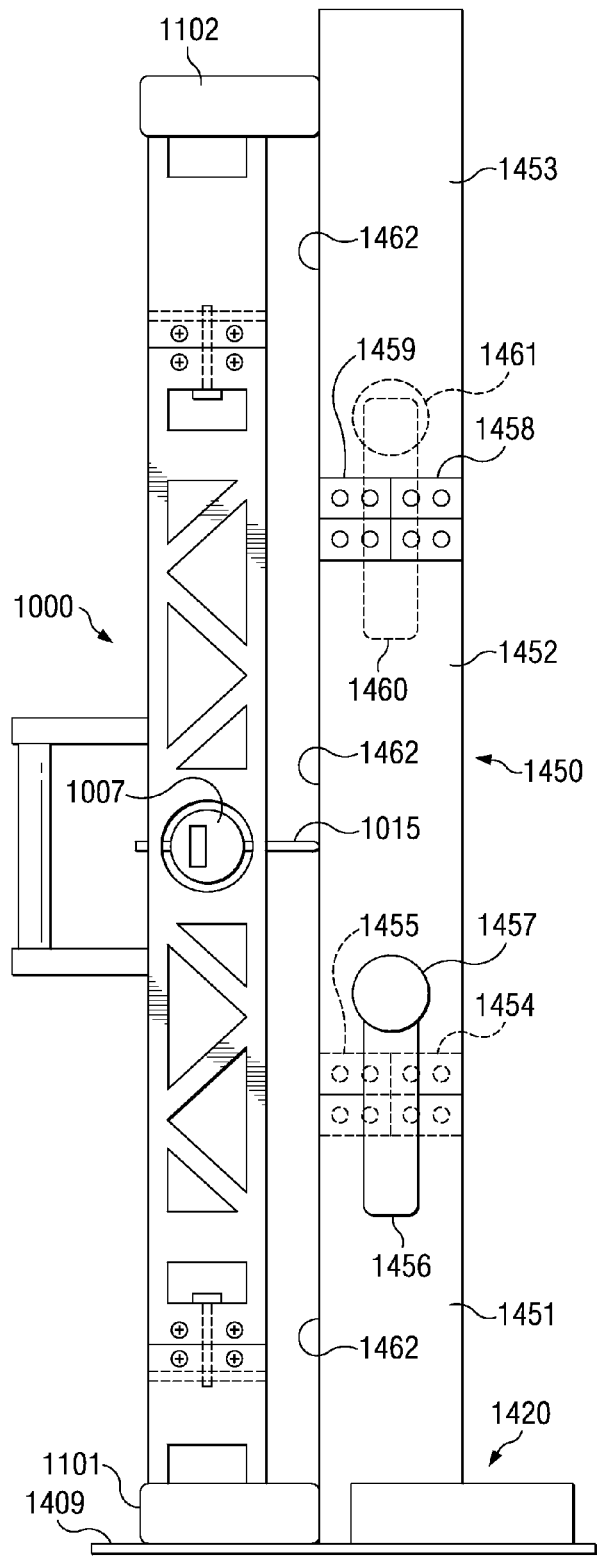
FIG. 12D is a side view of a preferred embodiment resting against a calibration bar of a preferred embodiment.

Referring to FIG. 12D in another embodiment, calibration bar 1450 has first portion 1451, second portion 1452, and third portion 1453. First portion 1451 and second portion 1452 are hingedly connected with hinges 1454 and 1455, each of which are secured to first portion 1451 and second portion 1452 with a set of fasteners. Other securing means known in the art may be employed. Second portion 1452 and third portion 1453 are hingedly connected with hinges 1458 and 1459, which are secured to second portion 1452 and third portion 1453 with a set of fasteners. Other securing means known in the art may be employed. First portion 1451, second portion 1452, and third portion 1453 form calibration surface 1462. Calibration bar 1450 is positioned generally perpendicularly to stand 1420.

Figure 12E:
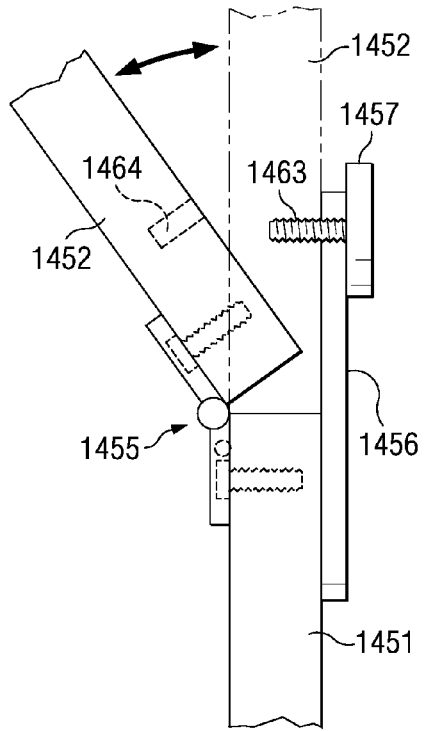
FIG. 12E is a partial side view of a calibration bar of a preferred embodiment.
Figure 12F:
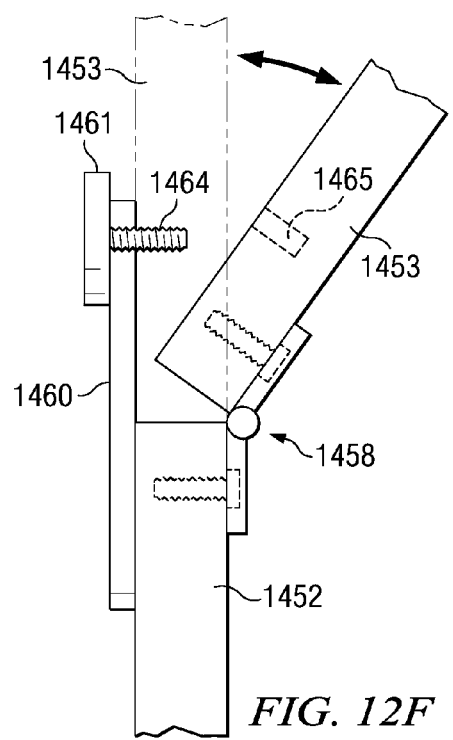
FIG. 12F is a partial side view of a calibration bar of a preferred embodiment.

Referring to FIGS. 12E and 12F, the hinged connection between first portion 1451 and second portion 1452 is opposite from the hinged connection between second portion 1452 and third portion 1453, thereby allowing calibration bar 1450 to collapse for easy transport and storage. Referring to FIG. 12E, first portion 1451 and second portion 1452 are secured into place adjacent to each other with support 1456 and securing knob 1457. Threaded portion 1463 of securing knob 1457 threadingly engages with receiving hole 1464 of second portion 1452. Referring to FIG. 12F, second portion 1452 and third portion 1453 are secured into place adjacent to each other with support 1460 and securing knob 1461. Threaded portion 1464 of securing knob 1461 threadingly engages with receiving hole 1465 of third portion 1453.

In a preferred embodiment, calibration bar 1400 is approximately 8 feet in length. In a preferred embodiment, calibration bar 1450 is approximately 11 feet in length. Other lengths may be utilized.

In a preferred embodiment, calibration bars 1400 and 1450 are made of solid steel and calibration surfaces 1410 and 1462 are ground flat and calibrated using laser interferometers. In these embodiments, calibration surfaces 1410 and 1462 have been ground flat to approximately 50 microns of deadstraight over 8 feet. Other materials of similar strength and accuracy properties may be employed.

In a preferred embodiment, hinges 1403, 1404, 1454, 1455, 1458, and 1459 are mil spec hinges. Other hinges with similar tolerance properties may be employed.

In a preferred embodiment, base 1407 and support 1408 of stand 1420 are made of stainless steel. Other materials having similar strength properties may be employed. In this embodiment, reference surface 1409 is made of stainless steel. Other materials having similar strength properties may be employed. In a preferred embodiment, reference surface 1409 is attached to base 1407 by a suitable welding means.

Referring to FIG. 12A in use, calibration bar 1400 is positioned generally perpendicularly to stand 1420. Measurement device 1000 is positioned adjacent reference surface 1409 and calibration surface 1410. Reference support 1101 is positioned adjacent reference surface 1409 and calibration surface 1410. Reference support 1102 is positioned adjacent calibration surface 1410. Probe 1015 of gauge 1007 extends and engages calibration surface 1410. Gauge 1007 is then calibrated to have a reading of zero when probe 1015 meets calibration surface 1410.

In a preferred embodiment, when extensions are added to or removed from measurement device 1000, gauge 1007 is recalibrated.

Referring to FIG. 12D in use, calibration bar 1450 is positioned generally perpendicularly to stand 1420. Measurement device 1000 is positioned adjacent reference surface 1409 and calibration surface 1462. Reference support 1101 is positioned adjacent reference surface 1409 and calibration surface 1462. Reference support 1102 is positioned adjacent calibration surface 1462. Probe 1015 of gauge 1007 extends and engages calibration surface 1462. Gauge 1007 is then calibrated to have a reading of zero when probe 1015 meets calibration surface 1462.

In a preferred embodiment, when extensions are removed from or added to measurement device 1000, gauge 1007 is recalibrated.

Figure 13B:
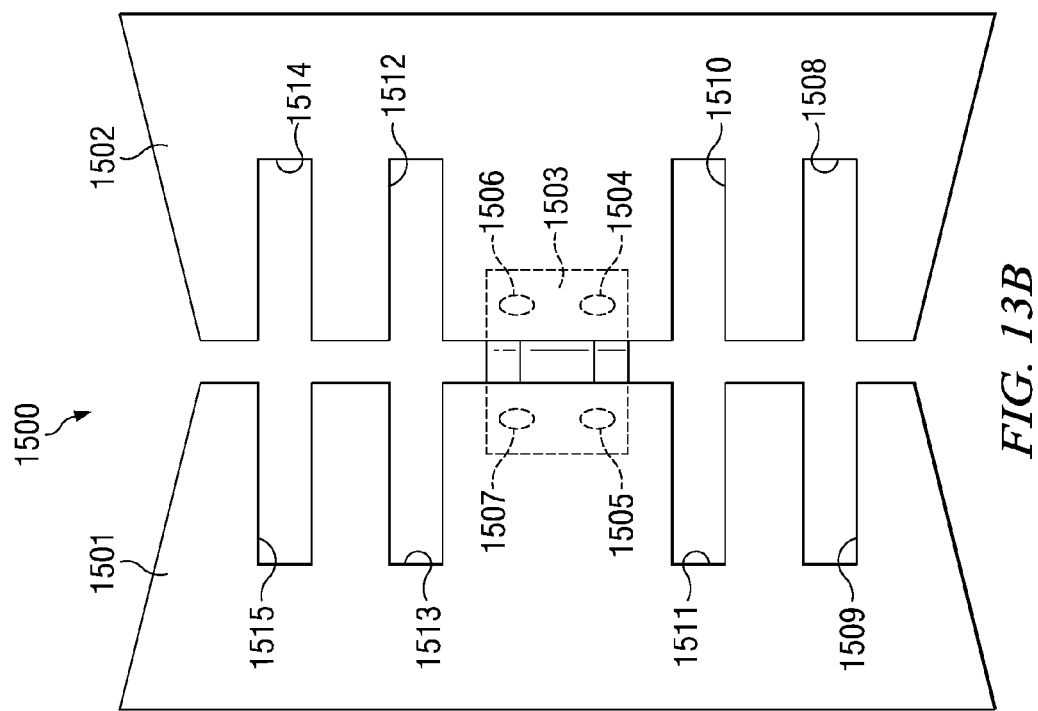
FIG. 13B is a top view of a rack of a preferred embodiment.
Figure 13A:
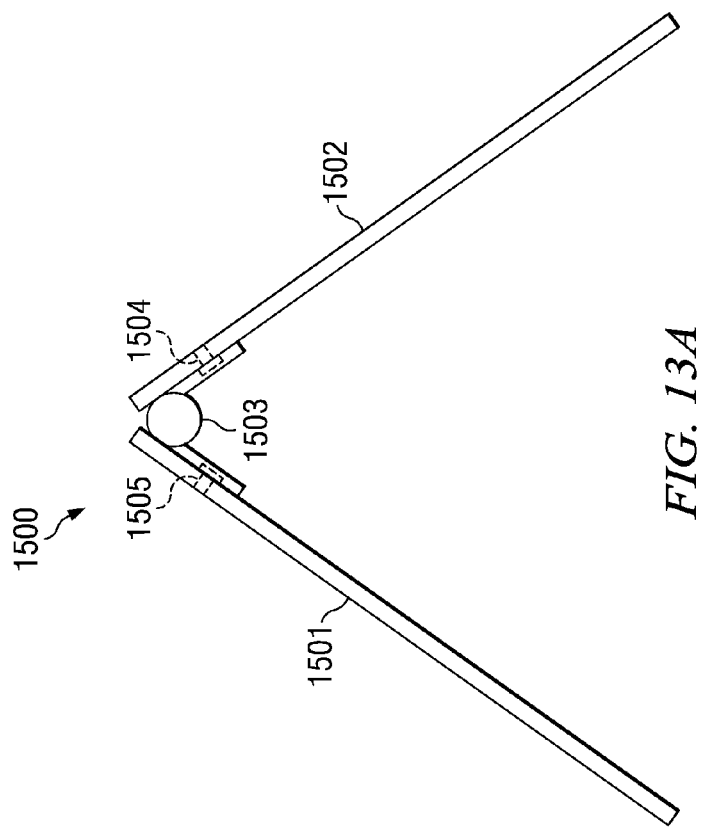
FIG. 13A is an end view of a rack of a preferred embodiment.

Referring to FIGS. 13A and 13B, rack 1500 has first planar member 1501 and second planar member 1502 hingedly connected to each other with hinge 1503. Hinge 1503 secures to first planar member 1501 with fasteners 1505 and 1507. Hinge 1503 secures to second planar member 1502 with fasteners 1504 and 1506. First planar member 1501 has slots 1509, 1511, 1513, and 1515, each of which is adapted to slidingly engage with elongate frame 1001 of measurement device 1000. Second planar member 1502 has slots 1508, 1510, 1512, and 1514, each of which is adapted to slidingly engage with elongate frame 1001 of measurement device 1000.

In a preferred embodiment, first planar member 1501 and second planar member 1502 are made of stainless steel and are plastic coated to reduce friction when engaged with elongate frame 1001 of measurement device 1000. In this embodiment, hinge 1503 is a mil spec hinge. Other hinges with similar tolerance properties may be employed.

Figure 13C:
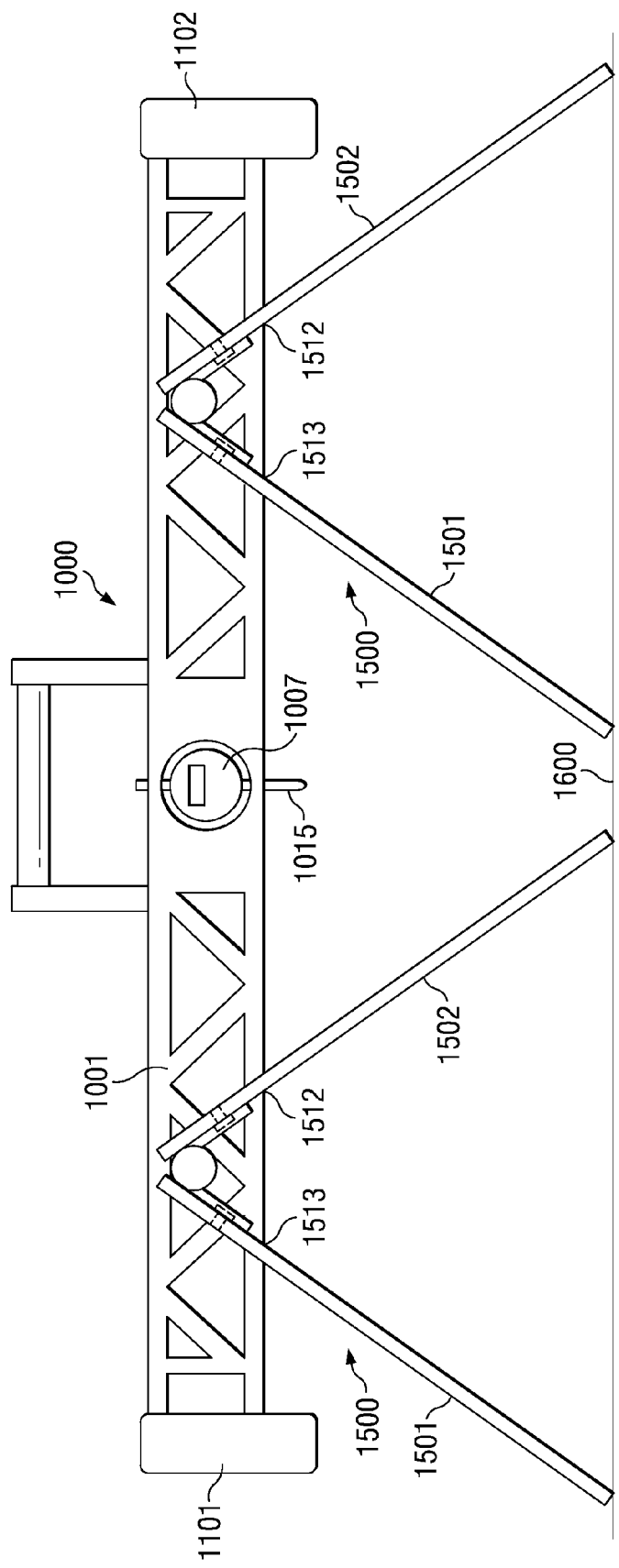
FIG. 13C is an end view of a pair of racks engaged with a measurement device of a preferred embodiment.

Referring to FIG. 13C in use, a pair of racks 1500 are positioned on surface 1600. Elongate frame 1001 of measurement device 1000 is inserted into slots 1513 and 1512 of racks 1500 to slidingly engage and support measurement device 1000, keeping reference support 1101, reference support 1102, and probe 1015 of gauge 1007 from contacting surface 1600, thereby reducing wear on these pieces and extending their usable life span. Other slots in racks 1500 may be utilized.

In other embodiments, a plurality of racks is employed.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A portable device for measuring deflection of a surface, comprising:
   a unitary elongate frame having a first end, a second end, and a first datum surface;
   a first removable reference support removably secured the first end;
   a second removable reference support removably secured the second end;
   a deflection gauge attached to the unitary elongate frame between the first removable reference support and the second removable reference support;
   the first removable reference support positioned at a first fixed position relative to the first datum surface and a second fixed position relative to the deflection gauge;
   the second removable reference support positioned at a third fixed position relative to the first datum surface and a fourth fixed position relative to the deflection gauge; and,
   wherein the deflection gauge engages and measures deflection of the surface relative to the first removable reference support and the second removable reference support.

2. The device of claim 1, wherein the first removable reference support has a second datum surface and the second removable reference support has a third datum surface.

3. The device of claim 2, wherein the deflection gauge is calibrated relative to the first removable reference support and the second removable reference support.

4. The device of claim 1, further comprising a handle attached to the unitary elongate frame.

5. The device of claim 1, wherein the deflection gauge is one of the group of acoustic, mechanical, and optical.

6. The device of claim 2, further comprising:
   a first extension having a fourth datum surface, attached to the first end of the unitary elongate frame; and
   a second extension having a fifth datum surface, attached to the second end of the unitary elongate frame; and
   wherein the first removable reference support is attached to the first extension and the second removable reference support is attached to the second extension; and, wherein the fourth datum surface and the fifth datum surface are adjacent to and aligned with the first datum surface.

7. The device of claim 6, wherein the first extension includes a first fastening means for engaging the elongate frame to orient the first removable reference support relative to the deflection gauge and wherein the second extension includes a second fastening means for engaging the unitary elongate frame to orient the second removable reference support relative to the deflection gauge.

8. The device of claim 7, comprising:
   a third extension having a sixth datum surface, attached to the first extension;
   a fourth extension having a seventh datum surface, attached to the second extension; and
   wherein the first removable reference support is attached to the third extension and the second removable reference support is attached to the fourth extension and wherein the sixth datum surface is adjacent to and aligned with the fourth datum surface and the seventh datum surface is adjacent to and aligned with the fifth datum surface.

9. The device of claim 8, wherein the third extension includes a third fastening means for engaging the first extension to orient the first removable reference support relative to the deflection gauge and wherein the fourth extension includes a fourth fastening means for engaging the second extension to orient the second removable reference support relative to the deflection gauge.

10. The device of claim 1, further comprising:
    a first extension having a third removable reference support, removably connected to the unitary elongate frame;
    a second extension having a fourth removable reference support, removably connected to the unitary elongate frame; and
    wherein the deflection gauge is calibrated relative to the third removable reference support and the fourth removable reference support.

11. A portable device for measuring deflection of a surface and operable by a single user, comprising:
    a unitary elongate frame member;
    a first foot and a second foot removably secured to the unitary elongate frame member;
    a measuring tool attached to the unitary elongate frame member;
    a probe associated with the unitary elongate frame member;
    the first foot positioned at a first fixed position relative to the unitary elongate frame member and at a second fixed position relative to the measuring tool;
    the second foot positioned at a third fixed position relative to the unitary elongate frame member and at a fourth fixed position relative to the measuring tool; and,
    wherein the measuring tool measures deflection of the surface by the probe touching the surface.

12. The device of claim 11, wherein the first foot and the second foot are coplanar.

13. The device of claim 12, wherein the measuring tool is attached between the first foot and the second foot.

14. The device of claim 13, wherein the measuring tool is calibrated relative to the height of the first foot and the second foot.

15. The device of claim 11, further comprising a handle attached to the unitary elongate frame member.

16. The device of claim 11, wherein the measuring tool includes a memory for storing a deflection value.

17. A system for calibration, comprising:
    a portable device for measuring deflection of a surface having an elongate frame;
    a first reference support removably attached to the elongate frame;
    a second reference support removably attached to the elongate frame;
    a deflection gauge attached to the elongate frame between the first reference support and the second reference support;
    a first support member;
    a second support member hingedly connected to the first support member;
    a first support beam secured to the first support member and releasably secured to the second support member;
    a stand supporting the first support member;
    whereby the first support member and the second support member form a calibration surface to calibrate the portable device.

18. The system of claim 17, wherein the stand further comprises:
    a base;

a reference surface attached to and adjacent to the base;
a brace attached to and adjacent to the base; and
wherein the first member is frictionally engaged with the brace; and, wherein the first member and the second member are positioned generally perpendicularly to the base.

19. The system of claim 17, further comprising:
a third support member hingedly connected to the second support member;
a second support beam secured to the second support member and releasably secured to the third support member;
whereby the first support member, the second support member, and the third support member form the calibration surface.

20. A system to support, comprising:
a portable device for measuring deflection of a surface having: an elongate frame, a first reference support removably attached to the elongate frame, a second reference support removably attached to the elongate frame, and a deflection gauge attached to the elongate frame between the first reference support and the second reference support;
at least two racks, each rack including:
   a first planar member having at least one slot adapted to receive the elongate frame;
   a second planar member having at least one slot adapted to receive the elongate frame, hingedly connected to the first planar member;
whereby the first reference support, the second reference support, and the deflection gauge are held in suspension.

21. A method for measuring deflection of a surface, utilizing a portable device for measuring deflection including: a unitary elongate frame member, a first reference support removably attached to the unitary elongate frame member, a second reference support removably attached to the unitary elongate frame member, a measuring tool attached to the unitary elongate frame member between the first reference support and the second reference support, the first removable reference support positioned at a first fixed position relative to the first datum surface and a second fixed position relative to the deflection gauge, the second removable reference support positioned at a third fixed position relative to the first datum surface and a fourth fixed position relative to the deflection gauge; the method comprising the steps of:
   holding the portable device by a handle;
   placing the first reference support and the second reference support against the surface;
   engaging the surface with the measuring tool; and
   making a measurement with the measuring tool to determine a deflection of the surface.

22. The method of claim 21, further comprising the step of calibrating the measuring tool relative to the first reference support and the second reference support.

23. The method of claim 22, wherein the step of calibrating the measuring tool further comprises the steps of:
   placing the first reference support and the second reference support against a calibration surface;
   lowering the measuring tool to rest against the calibration surface; and
   adjusting the measuring tool to read zero as it rests against the calibration surface.

24. A method for measuring deflection of a surface, utilizing a portable device for measuring deflection including: an elongate frame member, a first reference support removably attached to the elongate frame member, a second reference support removably attached to the elongate frame member, a measuring tool attached to the elongate frame member between the first reference support and the second reference support, a first extension having a reference support and attachable to the elongate frame member, a second extension having a reference support and attachable to the elongate frame member; the method comprising the steps of:
   removing the first reference support and the second reference support from the elongate frame;
   attaching the first extension to the elongate frame member;
   attaching the second extension to the elongate frame member;
   holding the portable device by a handle;
   placing the reference support of the first extension and the reference support of the second extension against the surface;
   engaging the surface with the measuring tool; and
   making a measurement with the measuring tool to determine deflection of the surface.

25. The method of claim 24, further comprising the step of zeroing the measuring tool.

26. The method of claim 25, wherein the step of zeroing the measuring tool further comprises the steps of:
   placing the reference support of the first extension and the reference support of the second extension against a calibration surface;
   lowering the measuring tool to rest against the calibration surface; and
   adjusting the measuring tool to read zero as it rests against the calibration surface.

* * * * *